Patented Aug. 6, 1946

2,405,440

UNITED STATES PATENT OFFICE 2,405,440

ISOMERIZATION OF OLEFINS

Nat H. Marsh, Baytown, Tex., assignor to Standard Oil Development Company, a corporation of Delaware No Drawing. Application October 23, 1944,
Serial No. 560,043

6 Claims. (Cl. 260—683.2)

The present invention is directed to a method for the isomerization of olefins.

According to the present invention, olefins having the double bond in the 1-position are isomerized into olefins with the double bond in the 2- or higher position by being subjected to the action of a catalyst comprising a sulfide of a metal appearing in groups VI or VIII of the periodic table at suitable temperatures and pressures. The temperature may be varied within wide limits between about 150° and 700° F. Preferably, the temperature is between about 300° and 500° F. The pressure may also vary within wide limits. Operating pressures between 0.5 and 50 atmospheres are suitable.

The process of the present invention finds wide application in refinery operations. For example, it is sometimes desirable to obtain from a cracked gasoline a fraction that is relatively rich in pentene-2. This is difficult of achievement by ordinary fractionation because any pentene-2 contained in the fraction will boil too close to any trimethyl ethylene and normal pentane contained in the fraction for separation by fractionation. According to the present invention a closely fractionated cut boiling between 83 and 91° F. is obtained from the gasoline by fractionation, this cut containing pentene-1 but being free from trimethyl ethylene and normal pentane. This cut is then isomerized, according to the present invention, producing a product in which the principal constituent boiling over 91° F. is pentene-2.

Another refinery operation in which the method of the present invention finds application is in the preparation of feed stocks for butadiene manufacture from C4 cuts. Here it is desired to isolate either butene-1 or butene-2 as the feed stock of the butadiene unit. Butene-1, however, boils too close to some of the other constituents of the C4 cut for easy separation by fractionation or by extractive distillation. By applying the method of the present invention to the C4 cut, however, the butene-1 is largely converted into butene-2 which is then readily separated from the C4 cut by extractive distillation in the presence of solvents such as aqueous acetone.

In the practice of the present invention it is preferred to use as a catalyst a combination of metal sulfides including one from group VI and one from group VIII of the periodic table. A particularly effective catalyst is one composed of sulfides of the elements nickel and tungsten. In such mixed catalysts favorable results are obtained by having the VIIIth group sulfide preponderating in the mixture. In this combination catalyst there is present a difficultly reducible sulfide and one which is capable of being reduced quite readily. In the use of these catalysts it is advantageous to include a small amount of hydrogen sulfide in the gaseous feed, a small amount constituting not more than about 10% by volume of the feed. These catalysts lose activity after a period of operation but may readily be regenerated by treatment with hydrogen at a temperature between 300° F. and 700° F.

In a specific operation according to the present invention, a sample of cracked gasoline boiling in the range of 83° to 91° F. was passed over a catalyst containing nickel sulfide and tungsten sulfide in the mole ratio of 2 to 1 at a temperature of 400° F. under a pressure of 30 pounds per square inch gauge at the rate of one volume of hydrocarbon per volume of catalyst per hour. The reaction appeared to proceed exothermically. Analytical data obtained on the reactor charge and the product are shown in the table below:

| Compound | Mole per cent in— | |
|---|---|---|
| | Charge | Product |
| Isopentane | 62.4 | 62.9 |
| 2-methylbutene-1 | 10.3 | 3.9 |
| Pentene-1 | 20.8 | 4.1 |
| Pentene-2 | 1.6 | 17.7 |
| n-Pentane | 4.0 | 4.1 |
| 2-methylbutene-2 | 1.0 | 7.4 |

It will be observed that the 2-methylbutene-1 was converted in a substantial degree to 2-methylbutene-2 while the pentene-1 was converted in a large degree to pentene-2. In each case isomerization was limited to shifting of the double bond. No rearrangement of the carbon skeleton was observed to take place. The pentanes remained substantially unchanged. Substantially the same results were obtained by repeated operations at different temperatures.

In another operation according to the present invention a C4 cut was passed over the same catalyst at 30 pounds per square inch gauge pressure at the rate of one liquid volume of hydrocarbon per volume of catalyst per hour at three different temperatures, 400°, 450° and 500° F. in three separate runs. Analytical results obtained on the charge and product samples are shown in the table below:

| Compound | Mole per cent in product obtained at reactor temp., °F. | | | |
|---|---|---|---|---|
| | Charge | 400 | 450 | 500 |
| n-Butane | 0.0 | 1.1 | 0.0 | 1.0 |
| i-Butane | 3.1 | 1.6 | 2.1 | 1.7 |
| Isobutylene | 2.7 | 0.3 | 0.0 | 0.6 |
| Butene-1 | 89.7 | 16.3 | 16.6 | 15.7 |
| Butene-2 | 3.5 | 80.7 | 81.3 | 81.0 |

From this table it will be observed that the butene-1 was isomerized specifically to butene-2.

In the appended claims, the term "non-skeletal isomerization of an olefin" is to be construed as meaning migration of the double bond from the 1-position to the 2- or higher position rather than as a rearrangement of the carbon skeleton, as by migration of a methyl group from the end of the carbon chain toward a central carbon atom in the chain.

The nature and objects of the present invention having been thus described and illustrated, what is claimed as new and useful and is desired to be secured by Letters Patent is:

1. A method for the non-skeletal isomerization of an olefin which comprises contacting it with a sulfide of a metal selected from the group consisting of nickel and tungsten at a temperature between about 150° and 700° F.

2. A method for the non-skeletal isomerization of an olefin which comprises contacting it with a sulfide of a metal of the group consisting of nickel and tungsten at a temperature between about 300° F. and 500° F.

3. A method for the non-skeletal isomerization of an olefin which comprises contacting it with a catalyst containing tungsten sulfide and nickel sulfide at a temperature between about 300° and 500° F.

4. A method according to claim 3 in which the nickel sulfide is contained in the catalyst in a greater amount than the tungsten sulfide.

5. A method according to claim 3 in which there is added to the olefin contacted with the catalyst a small amount of hydrogen sulfide.

6. A method according to claim 3 in which, after the operation has been continued until the catalyst displays reduced activity, the olefin feed is replaced by hydrogen for a period of time sufficient to restore the activity of the catalyst.

NAT H. MARSH.